United States Patent
Hakenberg

(10) Patent No.: US 11,724,608 B2
(45) Date of Patent: Aug. 15, 2023

(54) CHARGING PLUG AND CHARGING PLUG/CHARGING SOCKET SYSTEM FOR CHARGING AN ELECTRIC VEHICLE

(71) Applicant: PAXOS CONSULTING & ENGINEERING GMBH & CO, KG., Langenfeld (DE)

(72) Inventor: Peter Hakenberg, Solingen (DE)

(73) Assignee: PAXOS CONSULTING & ENGINEERING GMBH & CO, KG, Langenfeld (DE)

( * ) Notice: Subject to any disclaimer, the term of this patent is extended or adjusted under 35 U.S.C. 154(b) by 28 days.

(21) Appl. No.: 17/652,564

(22) Filed: Feb. 25, 2022

(65) Prior Publication Data
US 2022/0176837 A1 Jun. 9, 2022

Related U.S. Application Data

(63) Continuation of application No. 16/639,989, filed as application No. PCT/EP2018/068116 on Jul. 4, 2018, now Pat. No. 11,285,828.

(30) Foreign Application Priority Data

Jul. 7, 2017 (DE) ...................... 10 2017 115 224.5

(51) Int. Cl.
*B60L 53/16* (2019.01)
*H01R 13/453* (2006.01)
(Continued)

(52) U.S. Cl.
CPC .......... *B60L 53/16* (2019.02); *H01R 13/4538* (2013.01); *H01R 24/58* (2013.01); *H01R 2107/00* (2013.01)

(58) Field of Classification Search
CPC ..... B60L 53/16; H01R 13/4538; H01R 24/58; H01R 2107/00
(Continued)

(56) References Cited

U.S. PATENT DOCUMENTS 3,202,953 A 8/1965 Seymour et al.
5,171,158 A * 12/1992 Cairns .................. H01R 13/523
439/190

(Continued)

FOREIGN PATENT DOCUMENTS

AT 516771 A1 8/2016
DE 102011114321 A1 3/2013
(Continued)

OTHER PUBLICATIONS

The International Preliminary Report on Patentability for PCT/EP2018/068116, dated Jan. 7, 2020, The International Bureau of WIPO, Geneva, Switzerland.
(Continued)

*Primary Examiner* — Alexander Gilman
(74) *Attorney, Agent, or Firm* — M&B IP Analysts, LLC

(57) ABSTRACT

A female charging socket for transferring charging current to an electrical vehicle via a male charging plug, wherein the charging socket has a hollow socket body to receive a plug body of the charging plug, wherein electrical contact areas running concentrically are interior to the charging socket and distributed therein in an axial direction; wherein the charging plug is insertable into the hollow socket body, the charging plug being formed of a conical or cylindrical plug body and having exterior thereto multiple electrical contact tracks running concentrically around the plug body distributed axially for making electrical contact with the electrical contact areas of the charging socket, and wherein the charging socket further comprises at least one spanning contact (Continued)

adapted to bring into electrical contact and hold at least one of the electrical contact areas of the charging socket with a corresponding respective electrical contact track of the charging plug.

15 Claims, 5 Drawing Sheets

(51) Int. Cl.
    *H01R 24/58*      (2011.01)
    *H01R 107/00*     (2006.01)

(58) Field of Classification Search
    USPC .................................................... 439/137
    See application file for complete search history.

(56) References Cited

U.S. PATENT DOCUMENTS

| | | | |
|---|---|---|---|
| 5,344,330 A * | 9/1994 | Hoffman | B60L 53/16 439/138 |
| 5,484,296 A * | 1/1996 | Taylor | H01R 13/523 439/669 |
| 5,574,815 A * | 11/1996 | Kneeland | H01B 11/1891 174/75 C |
| 5,584,715 A * | 12/1996 | Ehrenfels | B60L 53/62 439/222 |
| 6,398,583 B1 * | 6/2002 | Zehren | H01R 13/59 439/205 |
| 7,535,706 B2 * | 5/2009 | Herberholt | B60L 53/14 361/679.41 |
| 8,246,372 B1 | 8/2012 | Walters | |
| 8,288,986 B2 | 10/2012 | Flack | |
| 8,292,645 B2 * | 10/2012 | Cairns | H01R 13/5202 439/271 |
| 9,620,896 B1 | 4/2017 | Dubbaka | |
| 9,627,905 B2 | 4/2017 | Green | |
| 9,742,112 B1 | 8/2017 | Dubbaka | |
| 9,787,112 B2 | 10/2017 | Sukup et al. | |
| 9,887,492 B2 * | 2/2018 | Umehara | H01R 13/631 |
| 10,431,944 B1 * | 10/2019 | Su | H01R 24/86 |
| 11,285,828 B2 * | 3/2022 | Hakenberg | H01R 13/005 |
| 2009/0237310 A1 * | 9/2009 | Ooi | H01Q 1/362 343/702 |
| 2009/0273310 A1 | 11/2009 | Flack | |
| 2011/0300738 A1 * | 12/2011 | Hengel | H01R 13/44 439/374 |
| 2012/0252250 A1 * | 10/2012 | Ku | B60L 50/16 439/304 |
| 2013/0293184 A1 | 11/2013 | Green | |
| 2014/0210410 A1 * | 7/2014 | Gorenzweig | B60L 53/16 320/109 |
| 2019/0217731 A1 * | 7/2019 | Rönfanz | H01R 31/06 |
| 2022/0144108 A1 * | 5/2022 | Garcia-Ferre | B60L 53/302 |
| 2022/0176837 A1 * | 6/2022 | Hakenberg | H01R 13/4538 |
| 2023/0135055 A1 * | 5/2023 | Wiegman | B60L 53/16 320/109 |

FOREIGN PATENT DOCUMENTS

| | | |
|---|---|---|
| WO | 2013055275 A1 | 4/2013 |
| WO | 2016119000 A1 | 8/2016 |

OTHER PUBLICATIONS

The International Search Report and the Written Opinion for PCT/EP2018/068116, dated Oct. 29, 2018, ISA/EP, Rijswijk, The Netherlands.
German Office Action for DE102017115224.5, dated Dec. 6, 2022. German Patent and Trademark Office, Munich, Germany.

* cited by examiner

CHARGING PLUG AND CHARGING PLUG/CHARGING SOCKET SYSTEM FOR CHARGING AN ELECTRIC VEHICLE

CROSS-REFERENCE TO RELATED APPLICATIONS

This application claims the benefit of U.S. patent application Ser. No. 16/639,989, which was filed on Feb. 18, 2020, which in turn claims priority under 35 U.S.C. § 371 to the International Application No. PCT/EP2018/068116, filed Jul. 4, 2018, and to the German Application No. 10 2017 115 224.5, filed Jul. 7, 2017. The contents of the aforementioned applications are hereby incorporated by reference.

DESCRIPTION

The present disclosure relates to a charging plug having multiple contact elements for making electrical contact between the charging plug and contact elements of a charging socket. The present disclosure further relates to a charging plug/charging socket system, having such a charging plug and a charging socket into which the charging plug is insertable in positively locking fashion to make an electrical contact between contact elements of the charging plug and contact elements of the charging socket.

Charging plugs for electrically drivable vehicles are known from the prior art that are molded for connection to a corresponding socket. Such plug/socket connections may be embodied in different ways and for example also comprise introduction aids, locking mechanisms or other supplementary features. The electrical contact between the lines of a charging cable and a corresponding charging component of a vehicle is typically made by multiple contact elements, with attempts being made to standardize the shape and arrangement thereof. In this way, a standardized plug system is supposed to be provided. It is thus commonplace for multiple contact pins to be used as contact elements for an electrical contact between plug and socket, said contact pins being pushed into corresponding contact openings. The contact elements fundamentally need to be dimensioned such that they can transfer sufficiently large charging currents. The contact area of a contact element needs to be designed to be so much larger, the larger the charging current to be transferred.

To produce rapid charging of an electric vehicle via a plug/socket connection of this kind, high charging currents need to be used. Scaling of the dimensions of the contact pins and contact sockets cannot be performed without restriction, however, since this results in a disadvantageous installation space increase and hence in larger plugs. Not only are these heavy and unwieldy, they also increase the costs of a charging station. There is therefore a need to transfer the highest possible charging currents using plug/socket systems having the smallest possible dimensions.

When an energy store of a motor vehicle is charged, the charging plug, which is in the form of a power plug contact, furthermore heats up. The heating of the plug contact should be limited to a specific temperature increase. In order to keep to a limited temperature increase of this kind, the plug connector geometries, which are standardized in the main, only allow the use of charging currents at a level that does not allow rapid charging of a vehicle, however. To solve this problem, for example DE 10 2015 100 347 A1 discloses an electrical connecting body that has a cooling fluid duct for cooling the connecting body with a cooling fluid.

Since the acceptance and spread of electric vehicles is also dependent on the charging time, there is thus a need for charging systems that allow the fastest charging possible without increasing the standardized dimensions. The object of the present disclosure is thus to provide a charging plug/charging socket system that allows increased charging currents even with small plug dimensions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a female charging socket for transferring a charging current to an electrically operable vehicle via a male charging plug, wherein the female charging socket has a hollow socket body adapted to receive a plug body of the male charging plug, wherein electrical contact areas running concentrically are formed interior to the female charging socket and distributed therein in an axial direction; wherein the male charging plug is adapted to be inserted into the hollow socket body of the female charging socket, the male charging plug being formed of a conical or cylindrical plug body and having on the exterior thereof multiple electrical contact tracks running concentrically around the plug body in a manner distributed in the axial direction that are adapted for making electrical contact with the electrical contact areas interior to the female charging socket, and wherein the female charging socket further comprises at least one spanning contact adapted to bring into electrical contact and hold at least one of the electrical contact areas of the female charging socket with a corresponding respective electrical contact track of the male charging plug.

Certain embodiments disclosed herein also include a charging system comprising: a female charging socket having a hollow socket body; and a male charging plug; the female charging socket being adapted to transfer a charging current to an electrically operable vehicle via the male charging plug, wherein the female charging socket is adapted to receive a plug body of the male charging plug, wherein electrical contact areas running concentrically are formed interior to the female charging socket and distributed therein in an axial direction; wherein the male charging plug is adapted to be inserted into the hollow socket body of the female charging socket, the male charging plug being formed of a conical or cylindrical plug body and having on the exterior thereof multiple electrical contact tracks running concentrically around the plug body in a manner distributed in the axial direction that are adapted for making electrical contact with the electrical contact areas interior to the female charging socket, and wherein the female charging socket further comprises at least one spanning contact adapted to bring into electrical contact and hold at least one of the electrical contact areas of the female charging socket with a corresponding respective electrical contact track of the male charging plug.

The charging plug according to the present disclosure can be used to transfer a charging current to an electrically operable vehicle. The charging plug in this case may be formed on the vehicle or on a charging cable to which the vehicle is connected during charging. The charging plug has multiple contact elements for making electrical contact between the charging plug and contact elements of a matching charging socket. Depending on the embodiment of the charging cable and the vehicle, this charging socket is likewise formed on the vehicle or on the charging cable.

According to the present disclosure, the charging plug has a conical or cylindrical plug body, on the outside of which are formed multiple contact tracks running concentrically around the plug body in a manner distributed in the axial direction. The contact tracks are situated around the plug body like rings. These contact tracks can be used to make electrical contact with appropriately shaped contacts of a charging socket. The plug body of the charging plug can be of conical or cylindrical shape. A receptacle on an associated charging socket matches this shape of the plug body so that the plug body can be inserted into this receptacle with the precisest possible fit. The charging socket for its part has inner contact elements or contact areas that make electrical contact with the outer contact tracks of the plug body when the charging plug and the charging socket are connected.

The present disclosure therefore turns away from conventional charging plugs having multiple contact pins that are pushed into openings in a charging socket in order to make contact with contacts of the charging socket there. In order to increase the transferrable charging current for rapid charging, the diameter of such contact pins would need to be increased to the extent that the dimensions of the charging plug would disadvantageously increase. The present disclosure instead uses large-area contact tracks on the outside of a plug body. In this way, the contact area between contact elements of the plug and the socket can be advantageously increased, in particular even doubled, for the same plug size.

Further, the arrangement of contact tracks on the outside of a plug body has the advantage that the inside of the plug body can be used for other functions. To this end, the plug body of the charging plug can have for example a cavity running axially through the plug body that can be used to accommodate further functional components. In one embodiment of the present disclosure, a cooling device 80, seen in FIGS. 3. and 4, for conducting a cooling medium 81 through the charging plug passes through such a cavity. This cooling device 80 can comprise not only feed and return connections for the cooling medium but also one or more valves. By way of example, a double ball valve can be used for the flow control of the cooling medium.

In one embodiment of the present disclosure, there is provision for such valve means in the charging plug to serve merely to return the cooling medium from a supply hose back to the charging cable. In this way, the heating of the charging plug can be kept within prescribed limits even during rapid charging. In another embodiment, there is provision for cooling medium also to be able to be provided to the electric vehicle when necessary in order to cool lines and in particular an energy store inside the vehicle. The valve means in the charging plug are then in a form such that they can carry a cooling medium either back to the charging cable or to a vehicle. The coolant is then carried to a vehicle through the charging plug and the charging socket of a vehicle. After passing through the applicable components of the vehicle, the heated cooling medium is carried back through the charging socket of the vehicle to the charging plug and the charging cable.

Connecting the cooling circuit of the charging cable to a vehicle is important in particular for rapid charging. However, use of vehicle cooling can also be advantageous when vehicles are in the sun or an underground garage, since the vehicles cannot release additional charging heat to the outside in these situations. As an alternative to cooling the vehicle, the charging column could also lower the charging power, however.

Whether the vehicle is supposed to be supplied with a cooling medium via the charging cable during charging is preferably decided by a control unit of the vehicle. If the vehicle has no devices for cooling energy stores, for example, the valve means of the charging plug would carry the cooling medium only through the charging plug and back through the charging cable as standard. If a vehicle has the opportunity for cooling, on the other hand, it can request this when necessary. This is effected by means of a control unit of the vehicle. In one embodiment of the present disclosure, the valve means of the charging plug are actuatable by a control unit of the vehicle via a communication connection, for example. In particular, the valve means of the charging plug are actuable via a push rod in this case.

The arrangement of contact tracks on the outside of the plug body of a charging plug therefore has various advantages. Besides the possible increase in the contact area for electrical contacts, the present disclosure also allows the advantageous accommodation of components of a cooling system inside the charging plug. The front of the charging plug may be able to be used entirely for the function of the cooling system in this case. There can, however, also be provision on the front for individual contacts for control lines at low voltage, since these do not require increased contact areas. There are then only the current contacts for the charging on the outside of the plug body.

In order to protect the outer contact tracks on the charging plug from damage and/or soiling and to protect people from contact with the contacts, there is preferably provision for a protective apparatus. By way of example, the charging plug has a cover that covers the contact tracks from the outside, wherein the cover is embodied so as to move in relation to the plug body. The cover can thus adopt an "open" position, in which the contact tracks are exposed, and a "closed" position, in which the contacts tracks are covered in a protective capacity. In a simple form of the present disclosure, the cover can be removed before the charging plug is inserted into a charging socket, and can be mounted on the charging plug again after charging. It is therefore a type of lid or protective sleeve. This is associated with considerable manual effort, however, and there is the risk of loss of the cover.

Greater advantage has thus been found in embodiments in which a cover is mounted displaceably on the charging plug, so that the cover can be moved out of the region of the contact tracks for charging. After charging, the cover is moved back into its protective position. By way of example, in the case of a charging plug with a cylindrical plug body, a cover can be formed by a hollow cylindrical protective tube mounted on the plug body so as to move coaxially in the region of the contact tracks.

In one embodiment of the present disclosure, a protective tube of this kind has, on its inside, an internal thread that is in engagement with an external thread on the plug body. By means of the threaded connection thus formed, the protective tube is mounted so as to be rotatable in relation to the plug body. The protective tube can be rotated, and thus moved axially, on the external thread of the plug body when driven manually or by motor. There is provision for a motor drive on the charging plug itself or on an associated charging socket.

The present disclosure also comprises a charging plug/charging socket system, having a charging plug according to one embodiment of the present disclosure and a charging socket in which the charging plug is insertable in positively locking fashion in order to make an electrical contact between contact elements of the charging plug and contact elements of the charging socket. In this case, the charging socket has a hollow socket body into which the plug body of the charging plug is insertable, wherein contact areas running concentrically in the socket body are formed on the inside of the socket body. These contact areas can likewise be annular contact tracks. In another embodiment of the present disclosure, spanning contacts are used that use a servomotor to bring contact areas into contact with the external contact tracks of the charging plug using the elbow lever principle. The contact tracks of the charging plug are then encompassed by the contact tracks of the charging socket, each contact track of the charging socket encompassing one contact track of the charging plug.

In order to move the described cover of the charging plug covering the contact tracks of the charging plug on the outside, the charging plug/charging socket system in one embodiment comprises drive means for moving said cover. By way of example, the charging socket has a servomotor 90 for moving a cover of the charging plug. The servomotor drives a gripper by means of which the cover is gripped and moved. In one embodiment of the present disclosure, such a servomotor is used not just for moving the cover but also for pulling the charging plug into the charging socket. The drive means then engage the cover such that they pull the charging plug into the charging socket when the cover moves away from the charging socket. This movement of the cover results not only in the contact tracks of the plug body being released but also in the charging plug being pulled into the charging socket as it were. This has the advantage that the charging plug and the charging socket are securely connected to one another.

BRIEF DESCRIPTION OF THE DRAWINGS

Furthermore advantages, special features and expedient developments of the present disclosure emerge from the subclaims and the description of preferred exemplary embodiments below with reference to the figures, in which:

DETAILED DESCRIPTION

Figure 1:
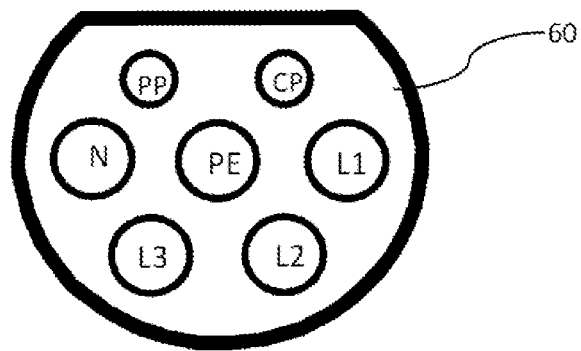
FIG. 1 shows a schematic front view of the connecting side of a charging plug from the prior art.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The charging plug according to the present disclosure is preferably part of a charging cable that is attached to a charging station for electrically operable vehicles. The charging station is connected to an energy source, from which current is transferrable to a vehicle via the charging cable. To this end, the charging cable is temporarily connected to the vehicle, this being done by means of an appropriate plug/socket connection. This usually involves the use of plug/socket connections as are depicted in exemplary fashion in FIGS. 1 and 2. FIG. 1 shows a front view of a charging plug 60, the connecting side of which has contacts formed on it for various single lines. The connecting body to be connected on the vehicle has corresponding contacts that are brought into electrical contact when the two components are connected. In the embodiment of FIG. 1, there is provision for multiple power lines for the charging current L1, L2, L3, a neutral line N and a protective line PE, for example. Further, there is in the charging cable a pilot signal line CP (control pilot) for transferring pilot signals and what is known as a plug present line (PP), by means of which an electric vehicle can indicate a charging station whether or not a charging cable having a plug is plugged in.

Figure 2:
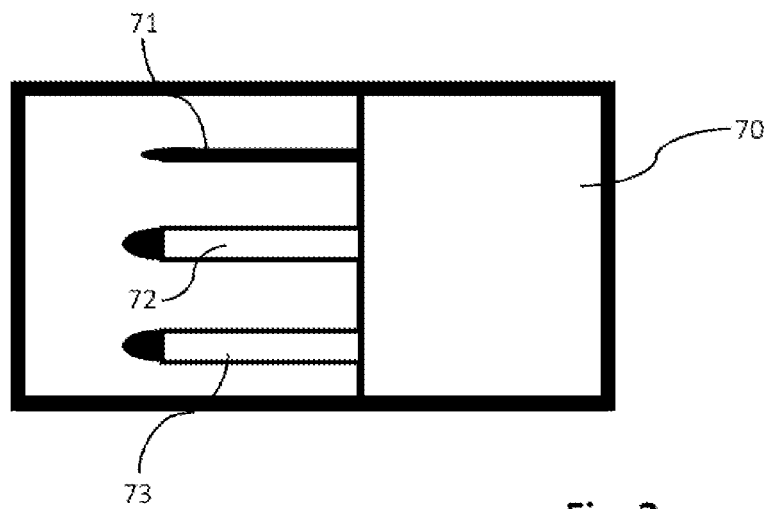
FIG. 2 shows a schematic longitudinal section through a charging plug as shown in FIG. 1.

In order to make contact with these lines L1, L2, L3, N. PE, CP and PP, there is provision for multiple contact pins 71, 72, 73 on an associated charging socket 70 (FIG. 2). Contact pins 71 for control lines CP and PP have a smaller diameter than contact pins 72, 73 for the other lines L1, L2, L3, N and PE. These contact pins 71, 72, 73 of the charging plug 70 are pushed into corresponding openings in the charging socket 60 in order to make an electrical contact there.

Figure 3:
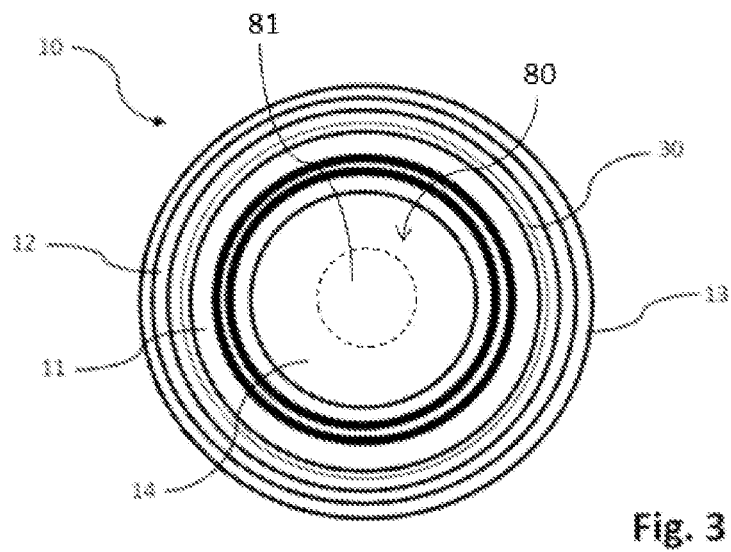
FIG. 3 shows a schematic front view of an embodiment of a charging plug according to the present disclosure.
Figure 4:
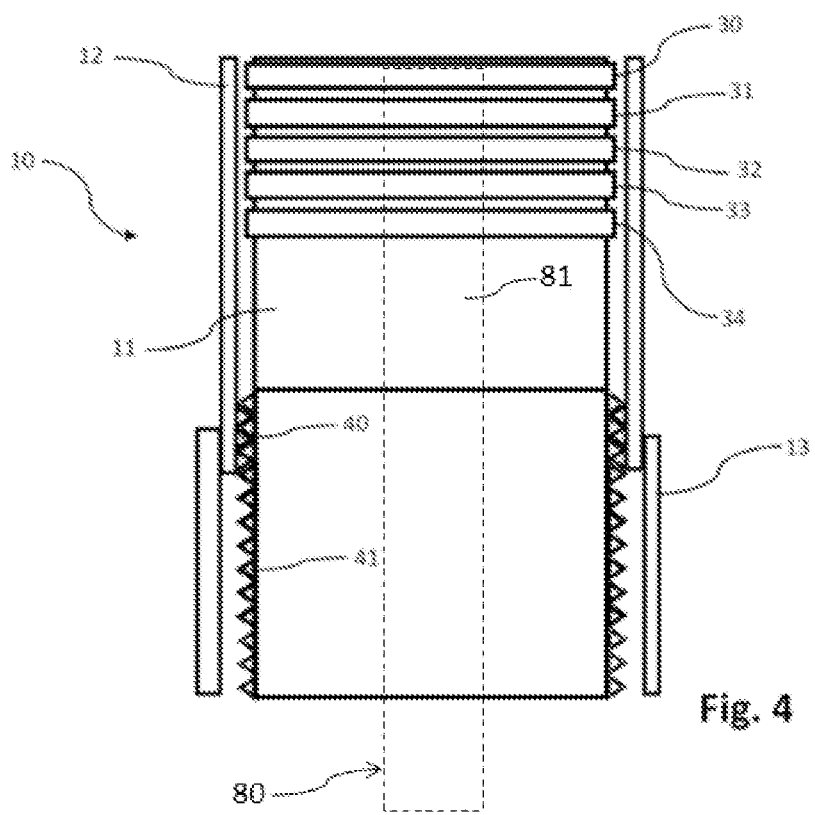
FIG. 4 shows a schematic side view of a charging plug as shown in FIG. 3 with the cover closed.

The present disclosure turns away from such known plug/socket systems having the known problems and instead provides a charging plug as shown in FIGS. 3 and 4. Fundamentally, the figures show the features relevant to the present disclosure only schematically in this case. It is clear to a person skilled in the art that these features can be complemented by known features such as housings, guides, locking mechanisms, etc. In this instance, FIG. 3 shows a plan view of the charging plug 10 in FIG. 4 from above. The charging plug 10 has a cylindrical plug body 11 that is preferably shaped as a hollow cylinder and therefore has a cavity 14. This cavity 14 can accommodate components of a cooling system (not depicted).

On the outside of the plug body 11, there is provision for multiple concentrically running contact tracks 30, 31, 32, 33 and 34 arranged beside one another in the axial direction. These contact tracks are depicted only schematically in FIG. 4 and are insulated from one another. The contact tracks are furthermore connected to lines of a charging cable, which can be lines L1, L2, L3, N, PE, CP and PP as in the case of known charging plugs. In the embodiment of FIG. 4, there are merely five contact tracks formed on the outside of the plug body 11 for the lines L1, L2, L3, N and PE. Circular contact tracks for the control lines CP and PP are formed on the front of the plug body 11, however. These are depicted in FIG. 3 by concentric black circles of greater thickness.

In one region of the plug body 11, there is furthermore an external thread 41 formed. A protective tube 12 having a corresponding internal thread 40 is screwed onto this external thread 41. FIG. 4 shows the protective tube 12 in the closed position, in which it conceals the contact tracks 30, 31, 32, 33 and 34 and thus shields them against contact from the outside. Part of the thread 41 and of the plug body 11 are accommodated in a housing 13, from which the plug body 11 with the contact tracks 30, 31, 32, 33 and 34 protrudes.

Figure 5:
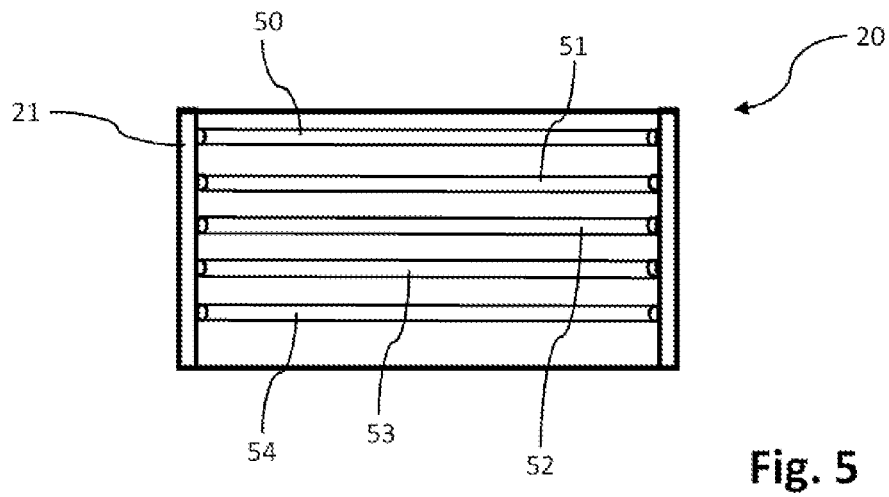
FIG. 5 shows a schematic side view of a charging socket.
Figure 6:
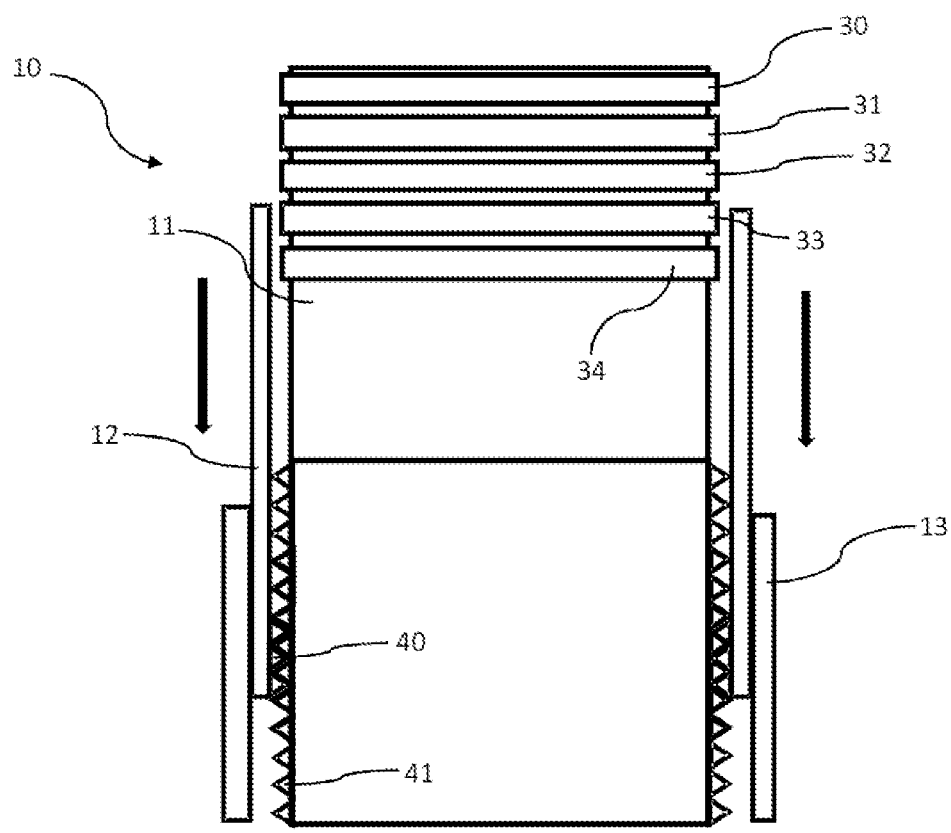
FIG. 6 shows a schematic side view of a charging plug as shown in FIG. 3 with the cover open.
Figure 7:
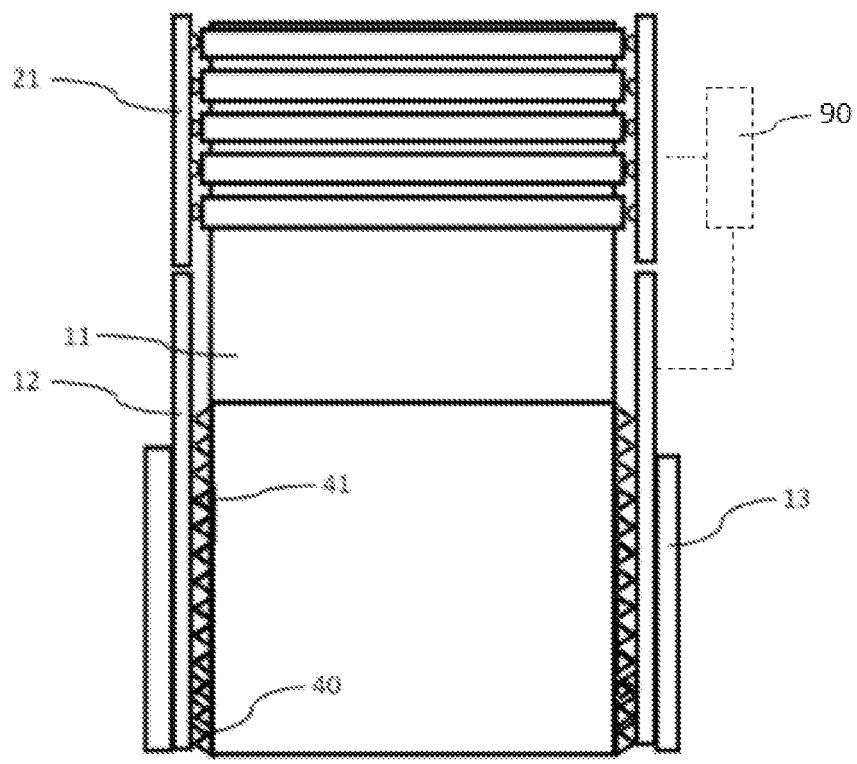
FIG. 7 shows a connected charging plug/charging socket system.
Figure 7A:
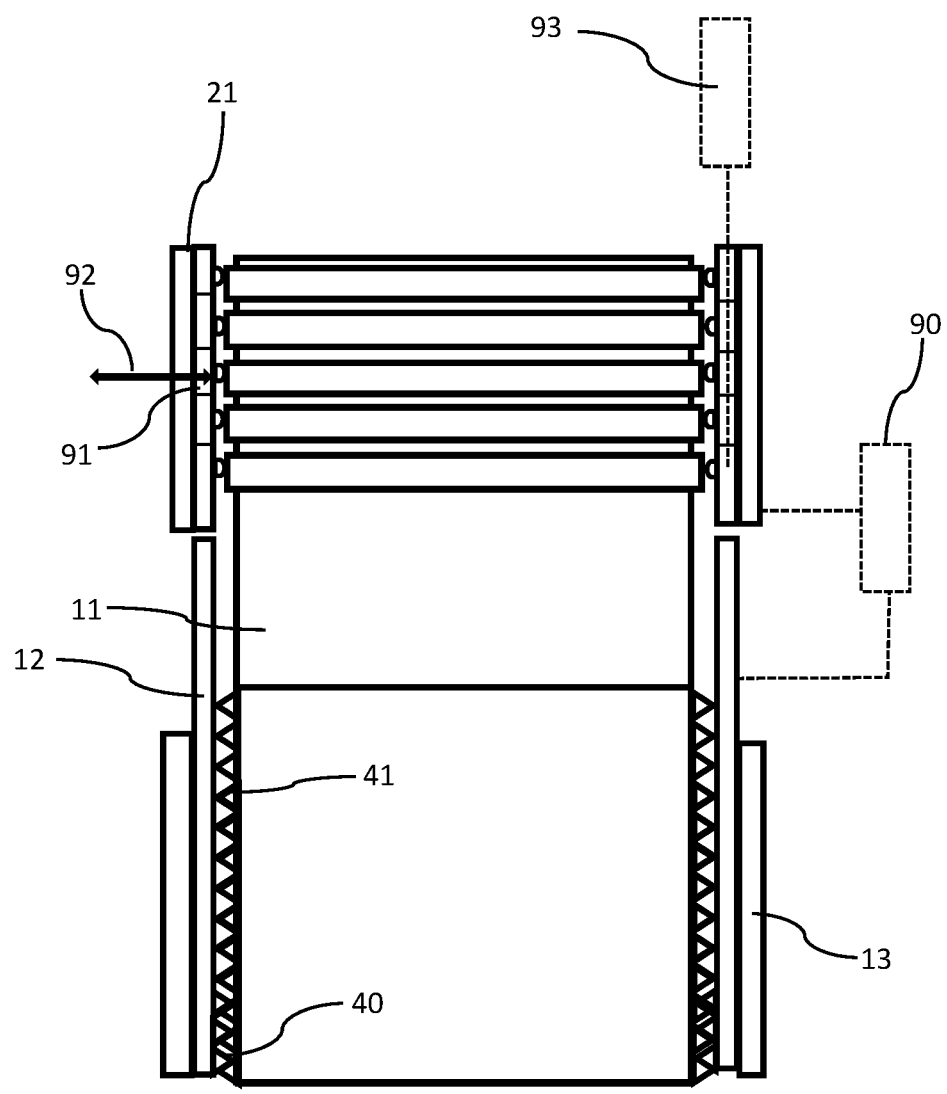
FIG. 7A shows a schematic view of a connected charging plug/charging socket system with spanning contacts.

The protective tube 12 can be rotated or pushed into an open position by a servomotor, not depicted. FIG. 6 conveys this process by means of two arrows in the direction of the housing 13. The servomotor rotates the protective tube 12 on the external thread 41, so that it is pushed in the direction of the housing 13 and thus releases the contact tracks 30, 31, 32, 33 and 34. A charging socket 20, as can be inferred from the schematic depiction of FIG. 5, can then be pushed over the plug body 11 of the charging plug 10. To this end, the charging socket 20 essentially has a hollow cylindrical socket body 21, on the inside of which multiple contacts are arranged. These contacts are depicted in simplified fashion in FIG. 5 as annular contact tracks 50, 51, 52, 53. Preferably, spanning contacts are used that, by means of a servomotor, can bring contact areas into contact with the external contact tracks of the charging plug 10 using the elbow lever principle. The contact tracks 30, 31, 32, 33 of the charging plug 10 are then encompassed by the contact tracks 50, 51, 52, 53 of the charging socket 20, each contact track of the charging socket encompassing one contact track of the charging plug. FIG. 7 shows a charging socket 20 after having been pushed onto the charging plug 10. FIG. 7A schematically shows spanning contacts 91, one of which is specifically designated, which are opened and closed by servomotor 93. The direction of spanning and releasing of spanning contacts 91 is depicted with a double arrow 92.

The invention claimed is:

1. A female charging socket for transferring a charging current to an electrically operable vehicle via a male charging plug,
    wherein the female charging socket has a hollow socket body adapted to receive a plug body of the male charging plug, wherein electrical contact areas running concentrically are formed interior to the female charging socket and distributed therein in an axial direction;
    wherein the male charging plug is adapted to be inserted into the hollow socket body of the female charging socket, the male charging plug being formed of a conical or cylindrical plug body and having on the exterior thereof multiple electrical contact tracks running concentrically around the plug body in a manner distributed in the axial direction that are adapted for making electrical contact with the electrical contact areas interior to the female charging socket, and
    wherein the female charging socket further comprises at least one spanning contact adapted to bring into electrical contact and hold at least one of the electrical contact areas of the female charging socket with a corresponding respective electrical contact track of the male charging plug.

2. The female charging socket of claim 1, further comprising a servomotor adapted to cause the at least one spanning contact to close so as to bring into electrical contact and hold the at least one of the electrical contact areas of the female charging socket with the corresponding respective electrical contact track of the male charging plug.

3. The female charging socket of claim 2, wherein the servomotor is arranged to bring the at least one of the electrical contact areas of the female charging socket with the corresponding respective electrical contact track of the male charging plug using an elbow lever principle.

4. The female charging socket of claim 2, wherein the servomotor is further adapted to cause the at least one spanning contact to open so as to release the at least one of the electrical contact areas of the female charging socket from the corresponding respective electrical contact track of the male charging plug.

5. The female charging socket of claim 1, wherein the spanning contact is further adapted to open so as to release the at least one of the electrical contact areas of the female charging socket from the corresponding respective electrical contact track of the male charging plug.

6. The female charging socket of claim 1, wherein the at least one spanning contact is adapted to bring into electrical contact and hold at least two of the electrical contact areas of the female charging socket with corresponding respective ones of the electrical contact tracks of the male charging plug.

7. A charging system comprising:
    a female charging socket having a hollow socket body; and
    a male charging plug;
    the female charging socket being adapted to transfer a charging current to an electrically operable vehicle via the male charging plug,
    wherein the female charging socket is adapted to receive a plug body of the male charging plug, wherein electrical contact areas running concentrically are formed interior to the female charging socket and distributed therein in an axial direction;
    wherein the male charging plug is adapted to be inserted into the hollow socket body of the female charging socket, the male charging plug being formed of a conical or cylindrical plug body and having on the exterior thereof multiple electrical contact tracks running concentrically around the plug body in a manner distributed in the axial direction that are adapted for making electrical contact with the electrical contact areas interior to the female charging socket, and
    wherein the female charging socket further comprises at least one spanning contact adapted to bring into electrical contact and hold at least one of the electrical contact areas of the female charging socket with a corresponding respective electrical contact track of the male charging plug.

8. The charging system of claim 7, further comprising:
    a cover of the charging plug that covers the contact tracks of the charging plug from the outside.

9. The charging system of claim of claim 7, wherein the plug body is hollow and the cover is a hollow cylindrical protective tube mounted on the plug body so as to move coaxially in the region of the contact.

10. The charging system of claim of claim 7, further comprising a drive coupled to move the cover of the charging plug.

11. The charging system of claim 7, wherein the at least one spanning contact is adapted to bring into electrical contact and hold at least two of the electrical contact areas of the female charging socket with corresponding respective ones of the electrical contact tracks of the male charging plug.

12. The charging system of claim of claim 7, wherein the female charging socket further includes a servomotor for moving the cover of the charging plug.

13. The charging system of claim of claim 12, wherein the servomotor engages the cover such that it pulls the male charging plug into the female charging socket as the cover moves away from the female charging socket.

14. The charging system of claim of claim 7, further comprising a servomotor adapted to cause the at least one spanning contact to close so as to bring into electrical contact and hold the at least one of the electrical contact areas of the female charging socket with the corresponding respective electrical contact track of the male charging plug.

15. The female charging socket of claim 14, wherein the servomotor is arranged to bring the at least one of the electrical contact areas of the female charging socket with the corresponding respective electrical contact track of the male charging plug using an elbow lever principle.

* * * * *